April 16, 1963  A. H. LAYCOCK ETAL  3,085,456
SHANK MOUNTING MEANS FOR A SLIDABLE OUTER JAW WRENCH
Filed Jan. 27, 1961
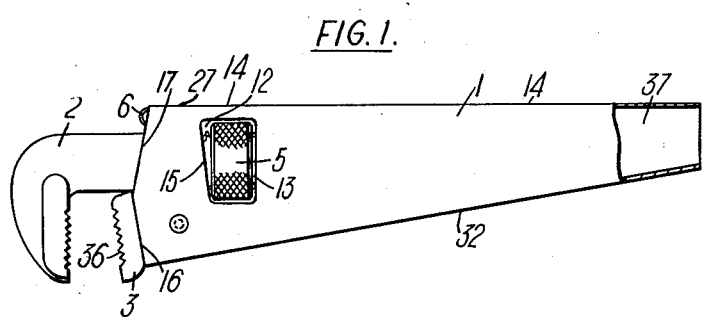
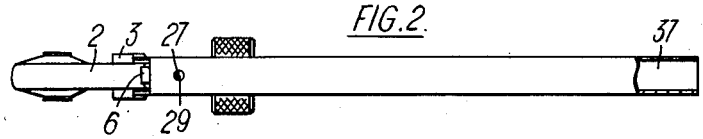
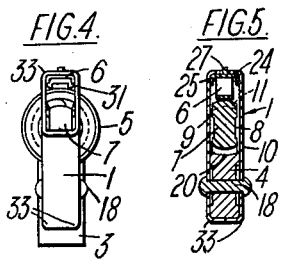
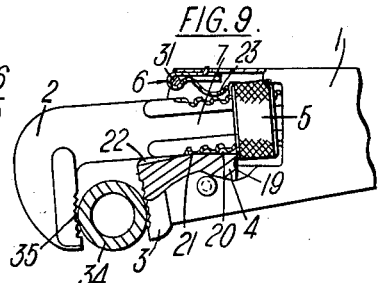
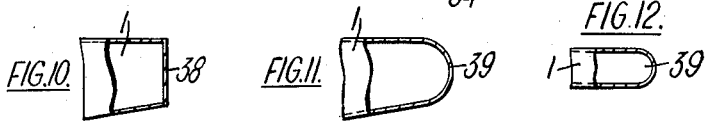
Inventors
Alfred H. Laycock
Thomas J. Lees
By
Watson, Cole, Grindle & Watson
Attorney

United States Patent Office 3,085,456
Patented Apr. 16, 1963

3,085,456
SHANK MOUNTING MEANS FOR A SLIDABLE OUTER JAW WRENCH
Alfred H. Laycock, Sheffield, England, and Thomas Jackson Lees, Adelaide, South Australia, Australia, assignors to C. & J. Hampton Limited, Sheffield, England
Filed Jan. 27, 1961, Ser. No. 85,300
Claims priority, application Great Britain Feb. 10, 1960
4 Claims. (Cl. 81—101)

This invention relates to pipe wrenches of the type in which a handle has secured at one end a jaw with tranverse serrations and has a lengthwise guide for receiving non-rotatably the screwed shank of a hook jaw by engagement with flattened sides of the shank, with transverse serrations on that jaw directed towards the screwed shank, these being oppositely directed to the tranverse serrations on the handle jaw, and with abutments on the handle to limit lengthwise movement of a nut threaded on the screwed shank. With the jaws adjusted by the nut until they engage a pipe or like object to be gripped, leverage on the handle in one direction causes the oppositely directed serrations to bite opposite sides of the object, aided by slight convergence of the jaws towards the screwed shank, while the hook jaw is held against movement away from the handle jaw by engagement of the nut with the limiting abutment that is at the side of the nut nearer the jaws. The leverage thus results in a gripping action that increases with the force applied to the handle. Reverse movement slackens the grip, and allows the serrations to "ratchet" backwards on the object, aided by loose guiding of the screwed shank, and possibly aided by a spring acting on the shank in a direction to urge the hook jaw repeatedly into gripping position.

According to the present invention, a pipe wrench of the type referred to comprises a hollow handle, with flat sides spaced to provide lateral guiding of the screwed shank, and with registering apertures in the sides through which the sides of the nut emerge.

The lengthwise movement of the nut is restricted by the distance between the front and rear edges of the registering apertures, that distance only needing to exceed the length of the nut sufficiently to enable it to be easily rotated for adjustment of the hook jaw. However, although the front edges of the apertures could themselves form abutments to be engaged by the end of the nut nearer the jaws it is preferable to provide a solid bridge between the sides of the handle to form a nut-engaging abutment, thus relieving the front edges of the apertures of the heavy force applied through the nut to resist movement of the hook jaw away from the handle jaw. The bridge is preferably of solid metal, filling the space between the sides of the handle below the bottom edge of the screwed shank. Conveniently, the bridge is integral with the handle jaw.

The sides of the screwed shank being guided by the sides of the handle, the bridge both guides and supports the bottom edge of the shank, and is hollowed to fit the bottom edge. The upper edge of the shank should be sufficiently clear of the upper edge of the handle for the shank to rock on the bridge. For that purpose, the length of the upper edge of the bridge extending from the abutment engaged by the nut, and receiving the lower edge of the shank under conditions of little or no load, can end in a rocking point, beyond which the remaining forward part of the upper edge diverges from the lower edge of the shank under these conditions. Under load, the shank rocks towards the forward part of the upper edge of the bridge. Since the nut must rock with the shank, the front edges of the nut apertures are preferably at right-angles to the forward part of the upper edge of the bridge, to keep the front end of the nut clear of those edges of the apertures.

The hollow handle permits the free end of the screwed shank to be enclosed. It may be totally enclosed if the handle has a completely tubular flat-sided section over its whole length. The upper and lower parts of the tubular section may be smoothly rounded, to afford a comfortable grip by the hand. The handle may taper towards its free end, which may be left open or may be closed and smoothly rounded to dimensions that facilitate gripping by the hand, the taper also imparting great strength to the handle.

Although the upper edge of the screwed shank may be loosely guided by the upper edge of the hollow handle, or by guide blocks secured inside that edge, it is convenient to insert a spring between the shank and that edge to assist in returning the hook jaw to gripping position during ratcheting. Thus, a U-spring formed from flat strip may be inserted from the jaw end of the handle, with a lower portion bearing on the screwed shank and an upper portion bearing in the upper edge of the handle and having an upturned nib that enters a locating hole formed in the material of the handle. To minimize risk of breakage of the spring, a pin may fill the bend of the U. The pin is preferably of a length to fit between the sides of the handle, which therefore serve to retain the pin in the bend of the spring.

The complete wrench may be composed of four main members only, a tubular handle (e.g., a sheet metal pressing, completed by welding), a handle jaw combined with a bridge secured between the sides of the handle, a hook jaw with flat-sided shank screw-threaded along its upper and lower edges, and a nut, to which may be added the spring referred to above.

The invention will now be further described with reference to the accompanying drawings, in which FIGURE 1 is a side view of one construction of wrench with a spring-urged screwed shank;

FIGURE 2 is a plan of FIGURE 1;

FIGURE 3 is a view corresponding to FIGURE 1 but with the handle and the spring shown in longitudinal section;

FIGURE 4 is an end elevation taken from the right-hand end of FIGURE 1;

FIGURE 5 is a section on the line V—V of FIGURE 3;

FIGURE 6 is a side view of the spring to a larger scale;

FIGURE 7 is a plan of FIGURE 6;

FIGURE 8 is an end elevation taken from the right-hand end of FIGURE 6;

FIGURE 9 is a part-sectional view corresponding to the left-hand end of FIGURE 1, showing the wrench in operation;

FIGURE 10 shows the end of a handle, as in FIGURE 3, closed by a plate;

FIGURE 11 corresponds to FIGURE 10 but shows an alternative closed end; and

FIGURE 12 is a sectional plan of FIGURE 11.

The wrench consists of four main members, a tapered tubular handle 1, an adjustable hook jaw member 2, emerging from the wider end of the handle, a fixed jaw 3 (a "handle jaw") integral with a bridge piece 4, firmly secured to the handle, and a nut 5, together with a small spring 6. The handle is formed from a sheet-metal pressing, completed into tubular form by welding (not shown). The jaw member 2 has a shank 7 with lengthwise recesses 8 so that it fits, with slight clearance, by upper and lower faces 9 the inside of the parallel sides 10 of the handle 1, so that the shank cannot rotate. The upper and lower edges of the shank are formed with screw threads 11 onto which the nut 5 fits. The nut is knurled and located in registering apertures 12 punched from the sides 10, each having a rear edge 13 at right-angles to the upper edge 14 of the handle and an inclined front edge 15 that converges downwardly with respect to the edge 13. The edge 15 is in fact substantially parallel to the jaw 3, which is held against correspondingly oblique end edges 16 that extend about half-way along the wider end of the handle 1, the remaining edges 17 at that end inclining oppositely towards the top edge 14 of the handle.

The bridge 4 fills the space between the lower portion of the sides 10 of the handle inside its wider end, where it is secured by a rivet 18. The bridge 4 protrudes slightly beyond the inclined front edges 15 of the apertures 12, to provide an abutment 19 against which the lower part of the front end of the nut 5 bears. Forwardly of the abutment 19, the top edge of the bridge 4 is hollowed by a lengthwise groove 20, shaped to fit the crests of the threads 11 on the lower edge of the stem 7. This groove 20 continues to a rocking point 21, beyond which the edge of the bridge, with a further groove 22, continues substantially at right-angles to the jaw 3.

At a point to the right of the point 21, the upper edge of the shank 7 is urged downwardly by the lower portion 23 of the spring 6, so that the shank tends to assume a position parallel to the upper edge 14 of the handle 1, as shown by FIGURE 3. The spring 6 (see particularly FIGURES 6 to 8) has a straight upper portion 24, which widens into a flat portion 25 having downturned flanges 26 to fit closely between the sides 10 of the handle 1 (see FIGURE 5). A nib 27, punched out of the flat portion 25 at 28, engages into a hole 29 in the upper edge 14 of the handle 1 when the spring 6 is pushed into the handle above the shank 7. The portions 23, 24 of the spring 6 are connected by a bend 30 that substantially surrounds a pin 31 with rounded ends, the pin being of a length to fit between the sides 10 of the handle 1, which retain the pin in the spring when the spring is located by engagement of the nib 27 in the hole 29. The pin 31 strengthens the spring 6 against breakage at the bend 30.

The lower edge 32 of the handle 1 tapers with respect to the upper edge 14, and the corners of the handle are rounded at 33 (FIGURES 4 and 5), so that a comfortable grip is provided for the hand.

The jaw of the hook member 2 adjusted by the nut 5 to provide a gap between the jaws 2, 3 appropriate to a pipe 34 to be gripped (FIGURE 9), with clockwise leverage on the handle 1 causing the shank 7 to rock about the point 21 of the bridge 4, the lower portion 23 of the spring 6 yielding to this rocking. At the same time, the resultant pull on the shank 7 urges the serrations 35 of the jaw 2, which are upwardly directed, i.e., towards the shank 7, against one side of the pipe, and the pipe is gripped at its other side by the oppositely, i.e., downwardly, directed serrations 36 of the jaw 3. The force along the shank 7 is transmitted by the nut 5 to the bridge 4 through the abutment 19. By rocking handle 1, the shank 7 rocks about the point 21, so that the pipe 34 can be rotated by a "ratchet" action.

The screw threads 11 of the shank 7 are protected against damage by their location inside the tubular handle 1. The narrow end 37 of the handle may be left open, as in FIGURES 1 and 2, or it may be closed, as by a welded plate 38 (FIGURE 10), or even rounded, for greater comfort in use, as by an integral cap 39 (FIGURES 11 and 12).

What we claim is:

1. A pipe wrench comprising a flat-sided hollow handle, a jaw secured at one end of the handle, a bridge-piece providing a rocking surface in that end of the handle, a hook jaw protruding from that end of the handle, a flat-sided shank of the hook jaw fitting between the flat sides of the handle and bearing on the rocking surface, a spring bearing on the shank to urge the hook jaw away from the other jaw, screw threads on the edges of the shank, an adjusting nut on the screw threads, and registering apertures in the flat sides of the handle to locate the nut in abutting relationship with an end of the bridge piece at the edges of the apertures nearest to the jaws.

2. A pipe wrench comprising a tubular sheet-metal handle with flat tapered sides, parallel to each other, a serrated jaw fixed partly across the end of the handle away from which the sides taper, the remainder of that end being left with an opening, a serrated hook jaw facing the fixed jaw, a shank on the hook jaw passing through the said opening into the handle, the shank being of a thickness to be guided between and by the flat sides of the handle, and of a width less than that of the opening, a bridge piece inside the handle behind the fixed jaw, the bridge piece being formed with a rocking surface to receive one edge of the shank, a spring bearing on the opposite edge of the shank to urge the hook jaw away from the fixed jaw, screw threads on the edges of the shank, an adjusting nut on the screw threads, and registering apertures in the flat sides of the handle to provide limiting abutments for the ends of the nut but shaped to allow the nut to move in accordance with the rocking movement permitted by the rocking surface to the shank both externally and internally of the handle.

3. A pipe wrench as in claim 2, wherein the spring is U-shaped, with a lower portion to bear on one edge of the shank and an upper portion to bear inside one edge of the handle, that upper portion having flanges to fit between the flat sides of the handle and also having an upturned nib, the edge of the handle against which the upper portion bears having a locating hole to receive the nib and thereby to retain the spring in position.

4. A pipe wrench as in claim 2, wherein the spring is U-shaped, with a lower portion to bear on one edge of the shank and an upper portion to bear inside one edge of the handle, a pin fitted in the bend of the spring, and means to retain the spring in bearing position, with the pin extending between the flat sides of the handle and retained in the bend by the flat sides.

References Cited in the file of this patent

UNITED STATES PATENTS

| | | |
|---|---|---|
| 549,221 | Wenger | Nov. 5, 1895 |
| 1,036,585 | Dolan | Aug. 27, 1912 |
| 1,143,350 | Benedict | June 15, 1915 |
| 1,426,647 | Illig | Aug. 22, 1922 |
| 1,552,091 | Thewes | Sept. 1, 1925 |
| 1,564,035 | Trabold | Dec. 1, 1925 |
| 2,610,534 | Shaff | Sept. 16, 1952 |
| 2,704,477 | Wright | Mar. 22, 1955 |